J. J. SCHEIB & J. G. GARBART.
FIFTH WHEEL FOR AUTOMOBILES.
APPLICATION FILED SEPT. 30, 1909.
948,829.
Patented Feb. 8, 1910.
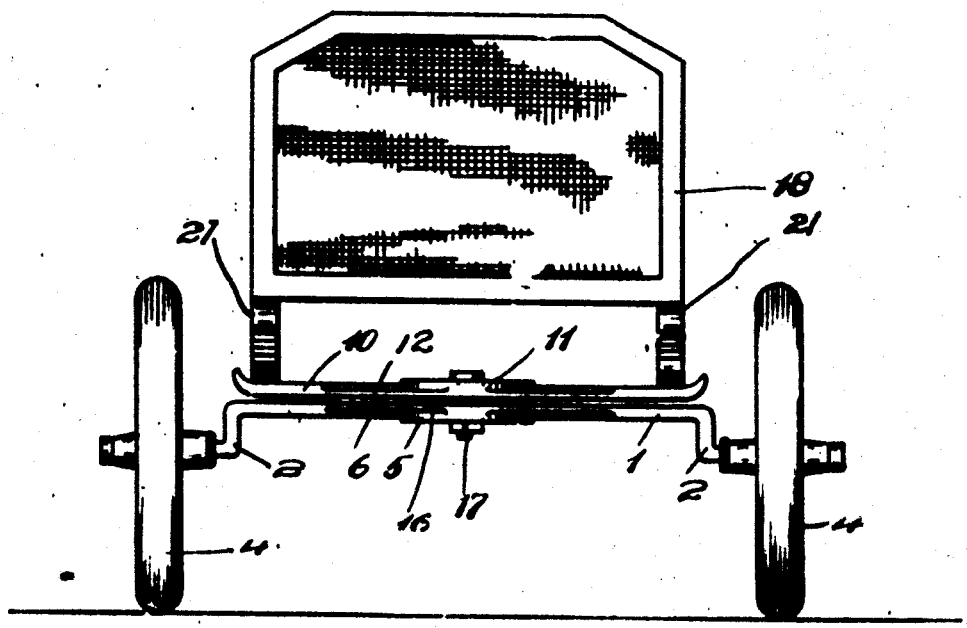
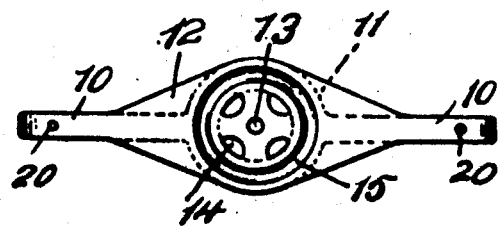
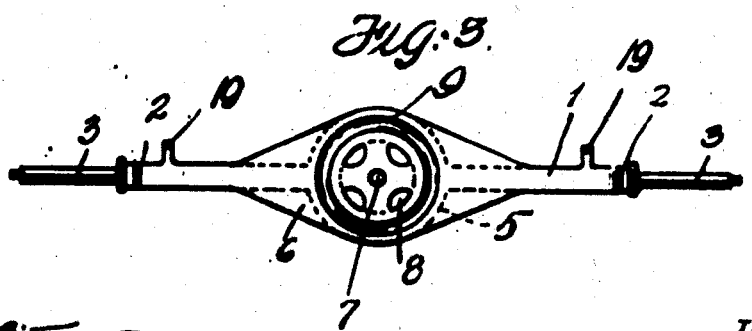

UNITED STATES PATENT OFFICE.

JOSEPH JOHN SCHEIB, OF PITTSBURG, AND JOHN G. GARBART, OF INGRAM, PENNSYLVANIA.

FIFTH-WHEEL FOR AUTOMOBILES.

948,829.

Specification of Letters Patent.

Patented Feb. 8, 1910.

Application filed September 30, 1909. Serial No. 520,285.

*To all whom it may concern:*

Be it known that we, (1) JOSEPH JOHN SCHEIB and (2) JOHN G. GARBART, citizens of the United States of America, residing at (1) Pittsburg and (2) Ingram, in the county of Allegheny and State of Pennsylvania, have invented certain new and useful Improvements in Fifth-Wheels for Automobiles, of which the following is a specification, reference being had therein to the accompanying drawing.

This invention relates to automobiles, and the objects of our invention are: first, to provide an automobile or similar vehicle with a fifth wheel, second, to arrange antifriction balls between the bearing surfaces of the fifth wheel, third, to eliminate the expensive and delicate steering mechanism of an automobile; fourth, to furnish an automobile with a one-piece axle, thereby obtaining strength and rigidity in the forward truck or frame of an automobile; and fifth, to provide a simple, inexpensive and durable forward truck for an automobile. These and such other objects as may hereinafter appear are attained by a fifth wheel construction that will be hereinafter described in detail and then claimed.

Reference will now be had to the drawing forming a part of this specification, wherein like numerals of reference designate corresponding parts throughout the several views, and in which:—

Figure 1 is an end or front elevation of an automobile provided with a fifth wheel constructed in accordance with our invention. Fig. 2 is an inverted plan of the upper member of the fifth wheel, and Fig. 3 is a plan of the lower member of the same.

In the drawing, the reference numeral 1 denotes an axle having off-set ends 2 provided with spindles 3 for revoluble wheels 4 adapted to support the forward end of an automobile or similar vehicle. The axle 1 intermediate the ends thereof is provided with an annular enlargement 5 of a greater depth than said axle, said enlargement having the vertical sides or periphery thereof connected to the axle 1 by horizontal webs 6. The enlargement 5 together with the axle 1 constitute one of the bearings of the fifth wheel, and said enlargement is provided with a central vertical king bolt opening 7, and with openings 8, the latter for the purpose of saving material in the construction of the fifth wheel, and is also provided with an annular ball race 9.

The reference numeral 10 denotes a bolster provided with a central annular enlargement 11, similar to the enlargement 5 of the axle 1, said enlargement 11 being connected to and reinforced relative to the bolster by horizontal webs 12. The enlargement 11 is provided with a central king-bolt opening 13 and with openings 14, the latter for the same purpose as the openings 8, and is further provided with an annular ball race 15.

The reference numeral 16 denotes antifriction balls arranged in the races 9 and 15, while 17 denotes a king bolt connecting the annular enlargements 5 and 11, constituting the upper and lower members of the fifth wheel.

The bolster 10 is provided adjacent its ends with openings 20 to receive hold-fast devices (not shown) by means of which the bolster is secured to springs 21 of the vehicle body 18, these springs and the body being of any well known type.

The axle 1 is provided with connections 19 for the steering mechanism (not shown) of the automobile.

From the foregoing it will be observed that an automobile constructed in accordance with our invention can make very short turns and can be handled in a comparatively small space.

It is thought that the operation and utility of our fifth wheel will be fully understood without further description, and while in the drawing there is illustrated a preferred embodiment of the invention; still we reserve the right to make such changes in the structural elements thereof as fall within the scope of the appended claim.

Having now described our invention what we claim as new, is:—

In an automobile the combination with a one-piece axle, and a bolster adapted to support the forward end of an automobile body, of central annular enlargements carried by said axle and said bolster and being of a greater depth than said axle and said bolster, horizontal webs connecting the peripheries of said enlargements to said axle and bolster, the confronting faces of said enlargements having annular ball races formed therein, anti-friction balls arranged in said races between said enlargements, and a king bolt adapted to connect said enlargements, substantially as, and for the purpose herein described.

In testimony whereof we affix our signatures in the presence of two witnesses.

JOSEPH JOHN SCHEID.
JOHN G. GARBART.

Witnesses:
H. C. EVERT,
DAVID FURNIER.